United States Patent [19]

Chen

[11] Patent Number: 5,019,809

[45] Date of Patent: May 28, 1991

[54] TWO-DIMENSIONAL EMULATION OF THREE-DIMENSIONAL TRACKBALL

[75] Inventor: Michael Chen, Sunnyvale, Calif.

[73] Assignee: University of Toronto Innovations Foundation, Toronto, Canada

[21] Appl. No.: 483,264

[22] Filed: Feb. 14, 1990

Related U.S. Application Data

[63] Continuation of Ser. No. 225,970, Jul. 29, 1988, abandoned.

[51] Int. Cl.$^5$ .............................................. G09G 5/00
[52] U.S. Cl. ............................. 340/815.31; 340/706; 340/727; 340/729
[58] Field of Search ............... 340/706, 709, 710, 724, 340/727, 729; 364/521, 522

[56] References Cited

U.S. PATENT DOCUMENTS

| | | |
|---|---|---|
| 3,539,860 | 11/1970 | Max et al. |
| 4,464,652 | 8/1984 | Lapson et al. ........................ 340/710 |
| 4,661,810 | 4/1987 | Himelstein . |
| 4,685,070 | 8/1987 | Flinchbaugh ........................ 364/522 |
| 4,692,756 | 9/1987 | Clark . |
| 4,734,690 | 3/1988 | Waller ................................. 340/729 |

OTHER PUBLICATIONS

Herot, et al, *One-Point Touch Input of Vector Information for Computer Displays,* Computer Graphics, vol. 12, No. 3 (Aug. 1978).

Nielson, et al, *Direct Manipulation Techniques for 3D Objects Using 2D Locator Devices,* Workshop Interactive 3D Graphics, held at the University of North Carolina, Chapel Hill, pp. 175-182 (Oct. 23-24, 1986).

Bier, E., *Skitters and Jacks: Interactive 3D Positioning Tools,* Workshop Interactive 3D Graphics, held at the University of North Carolina, Chapel Hill, pp. 183-196 (Oct. 23-24, 1986).

Sutherland, I., *Three-Dimensional Data Input by Tablet,* Proceedings of the IEEE, pp. 266-274 (Apr. 1974).

Evans, et al, *Tablet-Based Valuators that Provide One, Two, or Three Designs of Freedom,* Computer Graphics, vol. 15, No. 3, (Aug. 1981), pp. 91-97.

Buxton, W., *There's More to Interaction Than Meets the Eye: Some Issues in Manual Input,* The Haptic Channel, chapter 8, pp. 366-375, in User Centred System Design: New Perspectives on Human-Computer Interaction, D. A. Norman & S. W. Draper, Eds. Lawrence Erlbaum Associate, Hillsdale, NJ (1986).

Chen, et al., *A Technique for Specifying Rotations in Three Dimensions Using a 2D Input Device,* IEEE Montech '87-COMPINT'87, pp. 118-120 (Nov. 9-11, 1987).

Primary Examiner—Jeffery A. Brier
Attorney, Agent, or Firm—Blakely, Sokoloff, Taylor & Zafman

[57] ABSTRACT

A technique using a 2-dimensional input controller such as a mouse, a 2-D trackball, a joystick, a touch screen, a touch tablet or a digitizer for rotating an object displayed by a computer controlled video display system in 3-dimensional representation. A user visible reference circle is provided, and a pointer associated with the 2-D input controller is moved by the user relative to the reference circle in a control movement mode. Movement of the pointer within the reference circle produces rotation of the displayed object about arbitrary axes in 3-dimensional space, while movement of the pointer on or outside the reference circle produces rotation about a 3-dimensional axis that is oriented toward the viewer.

30 Claims, 3 Drawing Sheets

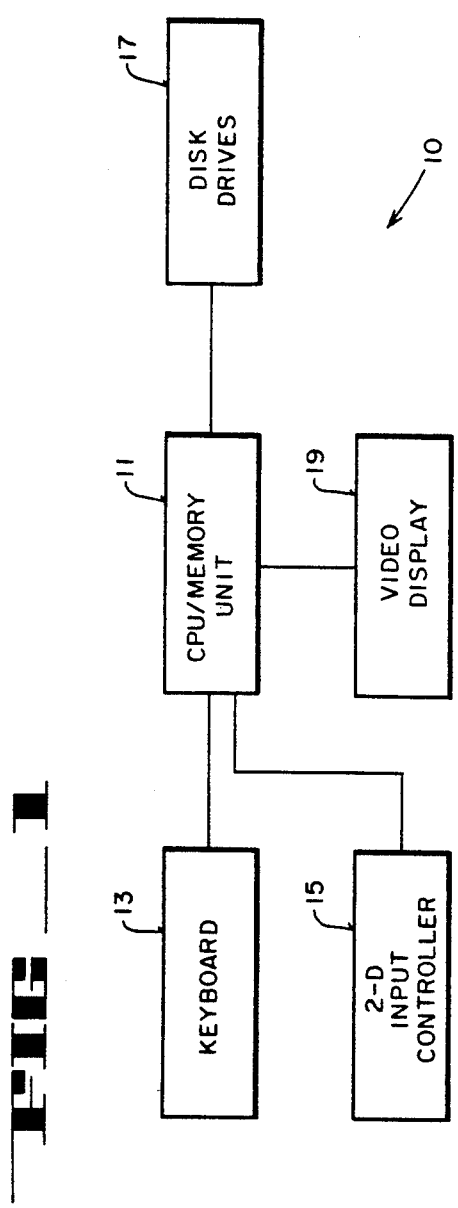
FIG — 1
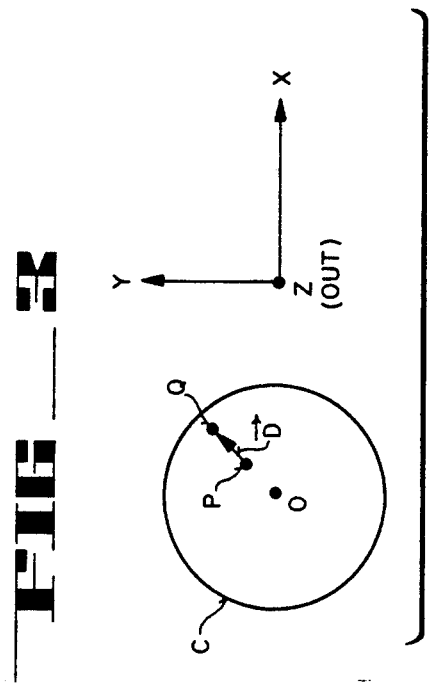
FIG — 3
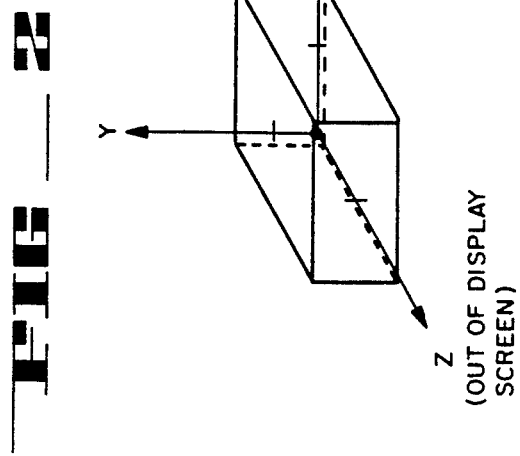
FIG — 2

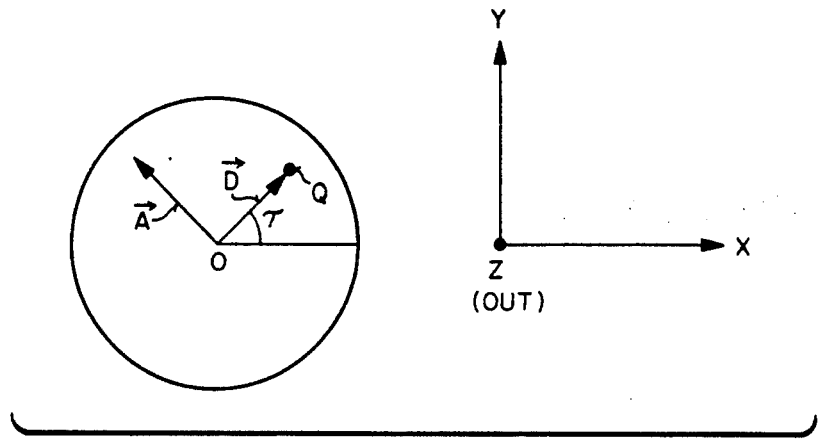
FIG_4
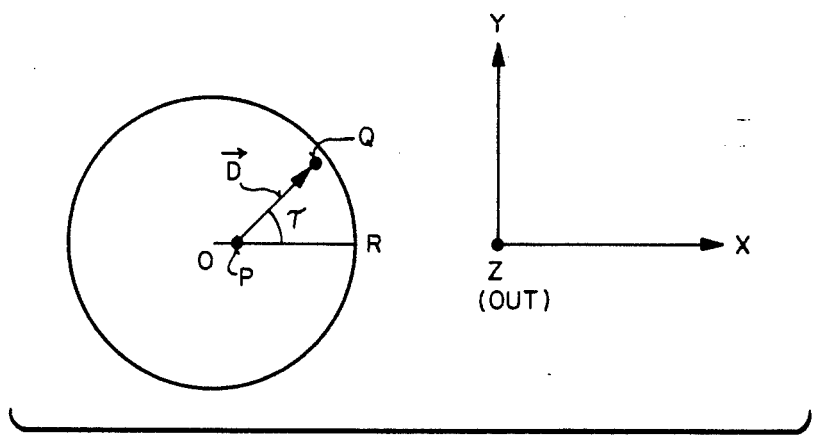
FIG_5
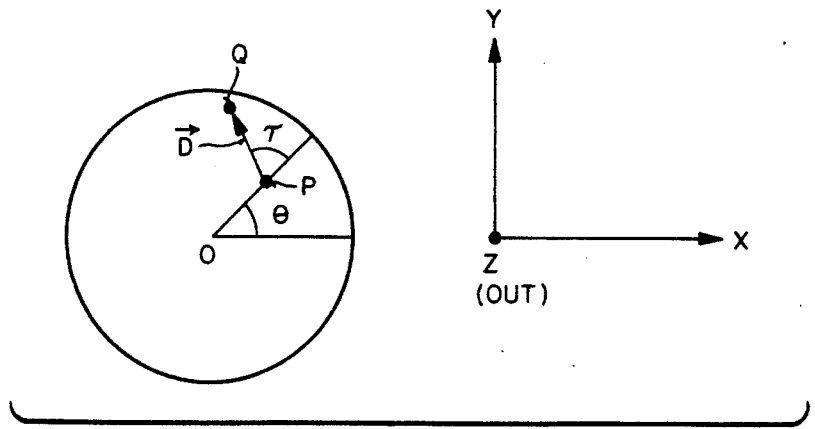
FIG_6

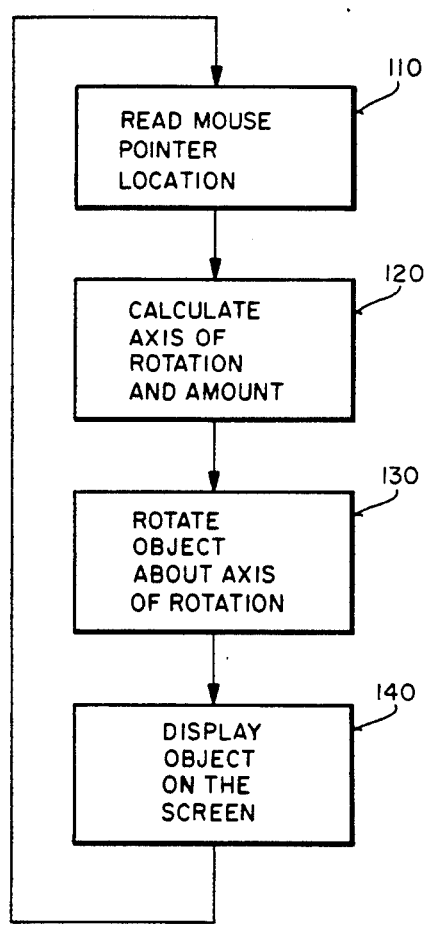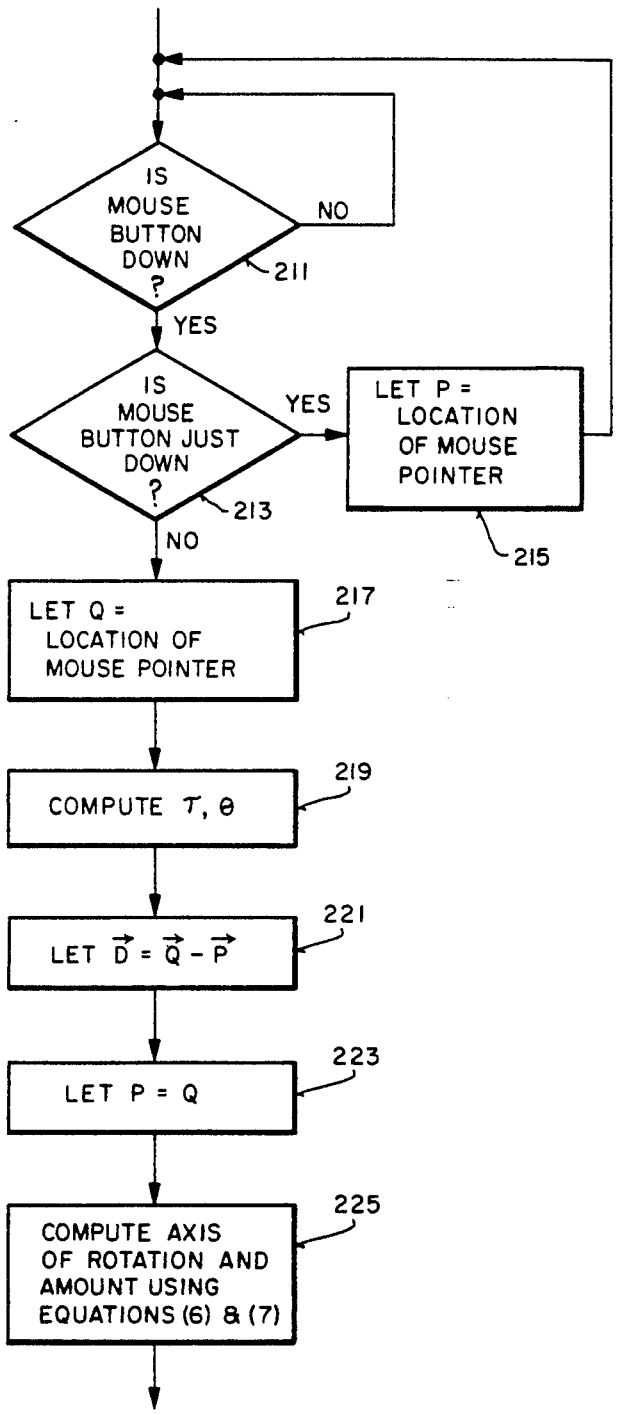

TWO-DIMENSIONAL EMULATION OF THREE-DIMENSIONAL TRACKBALL

This is a continuation of application Ser. No. 225,970 filed 7/29/88 now abandoned.

BACKGROUND OF THE INVENTION

The disclosed invention is directed to a technique for emulating a three-dimensional computer input controller device with a two-dimensional computer input controller device.

The advances in computer graphics have extended the range of capabilities for the user. Objects can now be displayed in three-dimensional (3-D) representation, for example in wireframe, solid and/or shaded forms.

While a 3-D trackball input controller device has been utilized for directly manipulating objects displayed in 3-D representation, it is complex and expensive.

Various techniques utilizing 2-dimensional input controllers such as a mouse have been developed for manipulating objects displayed in 3-D representation.

A known technique utilizes graphically displayed X, Y and Z sliders which are adjusted by the user (for example, with an input controller such as a mouse) to indicate the amount of rotation about each axis independently. Typically, only one slider is adjusted at any given time.

Another known technique involves the menu selection of the axis about which rotation is desired. An input controller such as a mouse is then moved in one dimension to indicate the amount of rotation.

Still another technique involves holding down one of three buttons on a mouse or a keyboard to select the axis of rotation, and then moving a mouse in one dimension to indicate the amount of rotation.

An important consideration with known techniques for manipulating displayed objects represented in 3-D form is the lack of kinesthetic correspondence (or stimulus-response compatibility) between the movement of the input controller device and the direction of object rotation. That is, the required movement of the input controller device does not provide the sense of actually rotating the displayed object.

A further consideration with known 2-D input controller techniques for manipulating 3-D objects is the lack of capability of continuously varying the axis of rotation in 3-space. For example, with the graphical slider technique, the axis for any given rotation is constrained one of the orthogonal axes.

Another consideration with known techniques is inability to provide rotation about an arbitrary axis that includes X, Y and Z components.

SUMMARY OF THE INVENTION

It would therefore be an advantage to provide an improved technique for rotating objects displayed in 3-D representation with 2-D input controller devices which provides for kinesthetic correspondence between input controller motion and displayed object rotation.

Another advantage would be to provide an improved technique for rotating displayed objects about any arbitrary axis in 3-space.

The foregoing and other advantages are provided in a method for rotating an object displayed in 3-dimensional representation on a computer controlled display system having a computer and a video display using a 2-dimensional input controller for positioning a reference indicator recognized by the computer. A user visible reference circle is provided, and the computer is signaled to activate a control movement mode wherein movement of the reference indicator in such mode is for rotating the displayed object about an arbitrary axis which is determined by the direction of the control movement of the reference indicator and the location of the control movement relative to the reference circle.

BRIEF DESCRIPTION OF THE DRAWING

The advantages and features of the disclosed invention will readily be appreciated by persons skilled in the art from the following detailed description when read in conjunction with the drawing wherein:

FIG. 1 is a block diagram of a computer system which can be utilized for implementing the disclosed invention.

FIG. 2 illustrates a coordinate system relative to the displayed object which is to be rotated in accordance with the invention.

FIG. 3 schematically illustrates the movement of a displayed pointer which is utilized with the invention for producing rotation of a displayed object.

FIGS. 4 and 5 schematically illustrate specific cases of displayed pointer movement for rotating a displayed object in accordance with the invention.

FIG. 6 schematically illustrates a generalized case of displayed pointer movement for rotating a displayed object in accordance with the invention.

FIG. 7 sets forth a flow diagram of the steps of the invention for rotating a displayed object pursuant to movement of a displayed pointer.

FIG. 8 sets forth a detailed flow diagram of certain functions provided pursuant to the flow diagram of FIG. 7.

DETAILED DESCRIPTION

In the following detailed description and in the several figures of the drawing, like elements are identified with like reference numerals.

Definitions

The disclosed invention generally involves the manipulation of a computer displayed object represented in 3-dimensional form, and it would be helpful to provide a brief discussion of the pertinent computer environment. FIG. 1 is a generalized block diagram of an appropriate computer system 10 which includes a CPU/memory unit 11 that generally comprises a microprocessor, related logic circuitry, and memory circuits. A keyboard 13 provides inputs to the CPU/memory unit 11, as does a 2-dimensional input controller 15 which by way of example can be a mouse, a 2-D trackball, a joystick, a touch screen, a touch tablet or a digitizer. Disk drives 17, which can include fixed disk drives, are used for mass storage of programs and data. Display output is provided by a video display 19.

Referring to FIG. 2, the object viewed on the video display 19 can be referenced for convenience relative to an orthogonal coordinate system that has its origin at the center of rotation of the object. The horizontal axis is the X axis, the vertical axis is the Y axis, and the Z axis is toward the viewer.

For ease of understanding, the following discussion will be in the context of a 2-dimensional input controller 15 that is a mouse, but it should be readily appreciated by those skilled in the art that the disclosed techniques can be implemented with other 2-D input controller devices. An example of a mouse device utilized with a computer controlled display system is set forth in U.S. Pat. No. 4,464,652, which is incorporated herein by reference.

A mouse controls the position of a mouse pointer that is displayed on the video display. The pointer is moved by moving the mouse over a flat surface in the desired direction of movement of the pointer. Thus, the 2-dimensional movement of the mouse on the flat surface translates into a corresponding 2-dimensional movement of the mouse pointer on the video display.

A mouse typically has one or more finger actuated control buttons. While the control buttons can be utilized for different functions such as selecting a menu option pointed to by the pointer, the disclosed invention advantageously utilizes a single mouse button to trace the movement of the pointer along a desired path. Specifically, the pointer is located at the desired starting location, the mouse button is depressed to signal the computer to activate a control movement mode, and the mouse is moved while maintaining the button depressed. After the desired path has been traced, the mouse button is released. This procedure is sometimes referred to as dragging the mouse pointer.

The location of the mouse pointer is typically sampled at a predetermined rate, for example 10 times per second, where each sampled location defines the start or end of a line segment. The path traced by dragging the mouse pointer can therefore be considered as comprising a series of interconnected short line segments, where the ends of the line segments are defined by the sampled mouse pointer locations.

It should be appreciated that a predetermined key on a keyboard could also be utilized to activate dragging the mouse pointer.

Detailed Discussion

Referring now to FIG. 3, a reference circle C is provided as a reference for the user inputs provided with the 2-D input controller 15. For the specific example of a mouse, the reference circle is displayed at a convenient location on the video display device. For input controllers such as a touch tablet or a digitizer where there is correspondence between the physical location of a physical pointer and location on the displayed image, the reference circle could be located on the appropriate input tablet.

By way of specific example for the use with a mouse, the reference circle can enclose the object to be rotated, which produces the impression that the object is secured in a transparent or virtual sphere which is rotated pursuant to appropriate inputs. The center of the circle O coincides with the origin of the orthogonal coordinate system of FIG. 2, which as discussed above is also the center of rotation.

The reference circle C can be considered as representing a flattened top hemisphere of a 3-D trackball input controller, "top hemisphere" referring to the top half of the trackball as it would be typically oriented on a support surface. Of course, the reference circle is a top plan view representation of the flattened top hemisphere of the trackball. As discussed more fully herein, the action of moving the physical or displayed pointer of a 2-D input controller, whichever is appropriate, relative to the reference circle is analogous to the action of rotating a 3-D trackball.

By way of example, a mouse is utilized to move a mouse pointer either within the reference circle or outside the reference circle. Dragging the mouse pointer (i.e., moving the mouse with the mouse button depressed) on or outside the reference circle C causes rotation about the Z axis. Dragging the mouse pointer within the reference circle provides for rotation about arbitrary axes of rotation that can have X, Y, and Z components. Specifically, for each line segment defined by the sampled locations of the dragged mouse pointer, the displayed object of interest is rotated as a function of the location, length and direction of the line segment. One of such line segments defined by two sequential location samples of a dragged mouse pointer is schematically illustrated as a vector D having a starting point P and an end point Q. For reference, the respective vectors from the center O to the points P and Q will be referred to as the vectors $\vec{P}$ and $\vec{Q}$.

For purposes of explaining the determination of the axis of rotation defined by an arbitrary vector $\vec{D}$, it would be helpful to initially discuss the specific case schematically illustrated in FIG. 4 where the vector $\vec{D}$ begins at the center O of the reference circle and makes an angle $\tau$ with respect to the X axis. The axis of rotation, which is conveniently represented as a vector $\vec{A}$, is calculated as follows:

$$\vec{A}(x,y,z) = [-\sin \tau \cos \tau 0 \; 0] \quad \text{(Equation 1)}$$

It should be appreciated that the axis of rotation obtained from Equation 1 is confined to the XY plane.

Taking now the specific case schematically illustrated in FIG. 5 where the vector $\vec{D}$ begins at a location on the X axis displaced positively from the origin and makes an angle $\tau$ with respect to the X axis. The axis of rotation is obtained from Equation 1 but rotated by $\omega$ degrees about the Y axis:

$$\omega = f(x) = f\left(\frac{OP}{OR}\right) \quad \text{(Equation 2)}$$

where OP is the distance between the center O of the circle and the start point P of the vector $\vec{D}$, OR is the radius of the circle 11, and f(x) is a monotonically increasing function that satisfies the following conditions:

$$f(x) = 0° \text{ if } x = 0 \quad \text{(Equation 3)}$$

$$f(x) = 90° \text{ if } x = 1$$

By way of specific example, f(x) can be:

$$f(x) = 90° x \quad \text{(Equation 4)}$$

The function f(x) is an interpolating function that allows the axis of rotation to lie on an arbitrary plane which intersects the Y axis. In essence, the function f(x) defines how the top hemisphere of a 3-D trackball is flattened into the reference circle C relative to the location of the axis of rotation. The function f(x) is analogous to projection mapping that a cartographer would use to map features of the earth onto a map.

The vector $\vec{A}$ (representing the axis of rotation) is determined as follows:

$$\vec{A}(x,y,z) = [-\sin\tau\cos\tau 0] \cdot \begin{bmatrix} \cos\omega & 0 & -\sin\omega \\ 0 & 1 & 0 \\ \sin\omega & 0 & \cos\omega \end{bmatrix}$$ (Equation 5)

In the generalized case schematically illustrated in FIG. 6 where P is arbitrarily located at an angle $\theta$ relative to the X axis, the vector $\vec{D}$ makes an angle $(\theta+\tau)$ relative to the X axis. Effectively, for the generalized case, the vector D of the special case represented by Equation 4 is rotated $\theta$ degrees about the Z axis. Thus, the vector $\vec{A}$ representing the axis of rotation is provided by modifying Equation 4 to include the rotation of $\theta$ degrees about the Z axis:

(Equation 6)

$$\vec{A}(x,y,z) = [-\sin\tau\cos\tau 0] \cdot \begin{bmatrix} \cos\omega & 0 & -\sin\omega \\ 0 & 1 & 0 \\ \sin\omega & 0 & \cos\omega \end{bmatrix} \cdot \begin{bmatrix} \cos\theta & \sin\theta & 0 \\ -\sin\theta & \cos\theta & 0 \\ 0 & 0 & 1 \end{bmatrix}$$

Equation 6 is Equation 5 modified so that the axis of rotation can be arbitrarily located in 3-dimensional space. It should be readily appreciated that Equation 6 simplifies to Equations 1 and 5 for the specific cases discussed above by inserting the appropriate zero values for the angles $\omega$ and $\theta$.

The amount of rotation $\phi$ for a given vector D could be computed from the magnitude of the vector D. For example, $\phi$ could be calculated by multiplying the magnitude of the vector D by a suitable scaling factor. However, to model the rolling of a 3-D trackball more precisely, the amount of rotation should be scaled such that the following properties are achieved:

(1) A full sweep of the mouse across the circle through the center O produces 180 degrees of rotation.
(2) A full circle around the edge of (or outside) the circle produces 360 degrees of rotation about the Z axis.

For the example of $f(x)=90*x$, it has been determined empirically that the foregoing rotational properties are well approximated by calculating the amount of rotation $\phi$ in degrees as follows:

(Equation 7)

$$\phi = 90* \frac{|D|}{OR} * \left[ \left(1 - \left(1 - \frac{0.2}{\pi}\right)\frac{\omega}{90}(1 - |\cos\tau|)\right) \right]$$

where $|D|$ is the length of the vector D and OR is the radius of the reference circle.

It should be appreciated that the formula to calculate the amount of rotation $\phi$ will be different for different interpolating functions f(x) if the foregoing rotational properties (1) and (b 2) are to be achieved.

For each vector D defined by two successive location sample of the dragged mouse pointer, an axis of rotation and the amount of rotation are calculated in accordance with Equations 6 and 7. The data representing the displayed object is processed to reflect the rotation, and the object display is updated to show the rotation.

Referring now to FIG. 7, set forth therein is a generalized flow diagram for implementing the foregoing 2-D technique for manipulating objects displayed in 3-D representation. Pursuant to a function block 110, the location of the dragged mouse pointer is determined. The axis of rotation and the amount of rotation $\phi$ are respectively calculated in accordance with Equations 5 and 6 pursuant to a function block 120.

The data representing the object to be rotated is processed pursuant to a function block 130 to include the rotation, and the rotated object is then displayed on the video display pursuant to a function block 140.

Referring now to FIG. 8, set forth therein is a more detailed flow diagram of the functions provided by the function blocks 110 and 120 of FIG. 7. Pursuant to a decision block 211 a determination is made as to whether the mouse button is down. If not, the determination pursuant to the decision block 211 is repeated. If the mouse button is down, a determination is made pursuant to a decision block 213 as to whether the mouse button has just been pushed down (i.e., that the mouse button was not pushed down prior to the most recent determination that it was down). If the mouse button was just pushed down, then pursuant to a function block 215, P is assigned the present value of the sampled mouse pointer location. Processing then returns to the decision block 211.

If the mouse button was not just pushed down (i.e., it had been down at least for the immediately preceding sample), then Q is assigned the present value of the sampled mouse pointer location pursuant to a function block 217. Processing continues with a function block 219 for the computation of the angles $\tau$ and $\theta$. Such computation is readily based on the locations of the points P and Q. Pursuant to a function block 221, the vector $\vec{D}$ is calculated by subtracting the vector $\vec{P}$ from the vector $\vec{Q}$.

Pursuant to a function block 223, the starting point for the next vector $\vec{D}$ is initialized by assigning the present value of Q to P. Finally, the axis of rotation and the amount of rotation are calculated pursuant to function block 225 in accordance with Equations 6 and 7.

Pursuant to known techniques, the information as to the axis of rotation and the amount of rotation is utilized to update the display of the object to reflect the rotation. For example, many systems use a transformation matrix to map a object data to display data. This matrix would be appropriately modified to reflect the rotation, and the transform matrix would then be applied to the object data to determine the display data that shows the rotation.

A simplified version utilizing the reference circle would be to transform mouse pointer movement within the reference circle to rotation about an axis that is strictly in the XY plane and would be calculated pursuant to Equation 1 above. Mouse movement on or outside the reference circle produces rotation about the Z axis. While this simplified technique provides continuous rotation only about arbitrary axes in the XY plane, simpler computations are utilized.

As stated earlier, the present invention can be utilized with a variety of 2-D input controllers. For those input controllers where the physical location of a physical pointer does not identify location on the displayed image, (e.g., a mouse or a 2-D trackball), the reference circle and a pointer are conveniently displayed on the video display. However, as to 2-D input controllers wherein the physical location of a physical pointer identifies a location on the displayed image (e.g., a digitizer or a touch tablet), the reference circle could be indicated on the input controller and the displayed pointer would not be utilized. For example, a reference circle could be marked on a digitizer tablet, and the sample point locations defined by the movement of the digitizer puck would define the vectors $\vec{D}$. Similarly, for a touch tablet, the reference circle would be marked on the tablet and the sampled locations of the pressure bearing movement of the user's finger or stylus would define the vectors $\vec{D}$.

Fundamentally, the disclosed invention transforms 2-dimensional movement provided by a 2-D input controller into a 3 continuously changing variables which, for example, can be the 3 orthogonal components of any arbitrary axis of rotation in 3-space.

The disclosed technique provides for direct and continuous manipulation by a 2-D input controller of an object displayed in 3-D representation. The technique specifically provides for excellent correspondence between input controller movement and the resulting rotation of the object. This is readily appreciated, for example, when the reference circle is a displayed reference circle which surrounds the displayed object to be rotated. A displayed pointer is superimposed on the object to be rotated, and dragging the pointer provides the impression of grasping the object and rotating it. The advantages of the technique of the invention can be further appreciated by considering the reference circle as representing a virtual sphere that surrounds the displayed object, and rotation is produced by rotating the sphere with the movement of or on a 2-D input controller. Simply stated, what you do is what you see. The disclosed technique is efficient and readily implemented with existing 2-D input controller devices. For many installed systems, the disclosed technique can be implemented by installing the appropriate software.

As mentioned previously, the disclosed technique using a 2-D input controller emulates a 3-D trackball controller. The reference circle represents a plan view of the exposed top portion of the 3-D trackball. Moving the pointer within the reference circle is analogous to rolling the trackball, while moving the pointer around the perimeter of the reference circle is analogous to twisting the trackball.

In addition to emulating a 3-D trackball, the technique of the invention provides advantages over the 3-D trackball. A 3-D trackball is difficult to roll and twist at the same time since the top hemisphere of the trackball cannot be completely exposed due to the necessary location of a rotation sensor at the "equator" of the trackball. Further, the three rotational sensors of a 3-D trackball are arranged orthogonally and must provide some slippage when the trackball rotation is not parallel to the rolling direction of a particular sensor. As a result of slippage, the accuracy of sensing rotation may be reduced. Also, the rotation sensing mechanism of a 3-D trackball includes substantial moving elements that must remain precisely aligned, and might not be sufficiently sturdy in hostile environments.

With the disclosed 2-D technique, the top hemisphere of a 3-D trackball is fully represented, and it is possible to simulate rolling and twisting at the same time. Moreover, since mechanical coupling is limited to 2 dimensions, inaccuracies due to slippage are reduced. Still further, the 2-D technique can be implemented with reduced moving elements for increased reliability and sturdiness.

Although the foregoing has been a description and illustration of specific embodiments of the invention, various modifications and changes thereto can be made by persons skilled in the art without departing from the scope and spirit of the invention as defined by the following claims.

What is claimed is:

1. A method for rotating an object displayed in three-dimensional representation on a computer controlled video display system having a computer and a video display, the method comprising the steps of:
   providing a reference circle;
   providing a user actuated input controller for selectively positioning a reference indicator recognized by the computer;
   signaling the computer to activate a control movement mode wherein the movement of the reference indicator in the control movement mode is for rotating the displayed object about an axis that is determined by the direction of the control movement of the reference indicator and the location of the control movement of the reference indicator relative to the reference circle;
   moving the reference indicator in the control movement mode using the input controller by moving said input controller in two-dimensions to provide a defined movement; and
   rotating the displayed object about any arbitrary axis in 3-dimensional space when said reference indicator is within said reference circle, said rotating being in accordance with the defined movement in the control movement mode.

2. The method of claim 1 wherein movement of the reference indicator on or outside the reference circle produces rotation about an axis that is oriented toward the viewer.

3. The method of claim 1 wherein the step of signalling the computer to activate the control movement mode includes the step of activating a switch.

4. The method of claim 1 wherein the reference circle is, displayed on the video display.

5. The method of claim 1 wherein the reference circle is provided on the input controller.

6. A method for rotating an object displayed in 3-dimensional representation on a computer controlled video display system having a computer and a video display, the method comprising the steps of:
   displaying a reference circle on the video display;
   providing a pointer control device for selectively positioning a pointer displayed on the video display;
   signaling the computer to activate a control movement mode wherein movement of the displayed pointer in the control movement mode is for rotating the displayed object about an axis that is determined by the direction of the control movement of the pointer and the location of the control movement of the pointer relative to the reference circle;
   moving the pointer in the control movement mode using the pointer control device; and
   rotating the displayed object in accordance with the movement of the pointer in the control movement mode.

7. The method of claim 6 wherein the reference circle encloses the displayed object to be rotated.

8. The method of claim 6 wherein control movement of the pointer on or outside the reference circle produces rotation about an axis that is oriented toward the viewer.

9. The method of claim 6 wherein the step of signaling the computer to activate the control movement mode includes the step of activating a switch.

10. The method of claim 9 wherein the pointer control device is a mouse.

11. The method of claim 10 wherein the switch in on the mouse.

12. The method of claim 10 wherein the mouse includes only one button.

13. A method for rotating an object displayed in three-dimensional representation on a computer controlled video display system having a computer and a video display, the method comprising the steps of:
providing a reference circle;
providing a user actuated input controller for selectively positioning a reference indicator recognized by the computer;
signalling the computer to activate a control movement mode wherein the movement of the reference indicator in the control movement mode is for rotating the displayed object about an axis that is determined by the direction of the control movement of the reference indicator and the location of the control movement of the reference indicator relative to the reference circle;
moving the reference indicator in the control movement mode using the input controller by moving said input controller in two dimensions to provide a defined movement; and
rotating the displayed object about any arbitrary axis in three-dimensional space when said reference indicator is within said reference circle, said rotating being in accordance with the defined movement in the control movement mode, wherein the rotation of the displayed object is defined solely by the direction of the movement of the reference indicator and the location of the control movement of the reference indicator relative to the reference circle, said arbitrary axis being user defined.

14. A method as in claim 13 wherein the movement of the reference indicator on or outside the reference circle produces rotation about only an axis that is oriented towards the viewer.

15. A method as in claim 13 wherein said input controller is a two-dimensional input controller.

16. A method as in claim 13 wherein movement of the reference indicator on or outside the reference circle produces rotation about only an axis that is oriented toward the viewer and wherein said input controller is a two-dimensional input controller.

17. A method as in claim 14 wherein the step of signaling the computer to activate the control movement mode includes the step of activating a switch and wherein the reference circle is displayed on the video display.

18. A method as in clam 14 wherein said input controller is a two-dimensional input controller, and wherein the reference circle is displayed on the video display.

19. A method as in claim 14 wherein said input controller provides for kinesthetic correspondence between input controller motion and displayed object rotation.

20. A method as in claim 19 wherein said input controller is a mouse.

21. A method as in claim 15 wherein said input controller provides for kinesthetic correspondence between input controller motion and displayed object rotation.

22. A method as in claim 21 wherein said input controller is a mouse.

23. A method as in claim 16 wherein said input controller provides for kinesthetic correspondence between input controller motion and displayed object rotation.

24. A method as in claim 18 wherein said input controller provides kinesthetic correspondence between input controller motion and displayed object rotation.

25. A method as in claim 24 wherein said input controller is a mouse.

26. A method as in claim 15 wherein said step of rotating the displayed object includes a step of computing a vector representing the axis of rotation.

27. A method as in claim 26 wherein the step of rotating the displayed object includes a step of determining the rotation such that a full sweep of the reference indicator across a diameter of the reference circle produces approximately 180 degrees of rotation.

28. A method as in claim 26 wherein the step of rotating the displayed object includes the step of determining the rotation such that a full sweep of the reference indicator around the edge of or outside the reference circle produces approximately 360 degrees of rotation about the Z axis.

29. A method for rotating an object displayed in three-dimensional representation on a computer controlled video display system having a computer and a video display, the method comprising the steps of:
providing a reference circle;
providing a user actuated input controller for selectively positioning a reference indicator recognized by the computer;
signaling the computer to activate a control movement mode wherein the movement of the reference indicator in the control movement mode is for rotating the displayed object about an axis that is determined by the direction of the control movement of the reference indicator and the location of the control movement of the reference indicator relative to the reference circle;
moving the reference indicator in two dimensions in the control movement mode to provide a defined movement; and
rotating the displayed object about any arbitrary axis in 3-dimensional space when said reference indicator is within said reference circle, said rotating being in accordance with the defined movement in the control movement mode.

30. A method for rotating an object displayed in three-dimensional representation on a computer controlled video display system having a computer and a video display, the method comprising the steps of:
providing a bounded reference region substantially resembling a circle;
providing a user actuated input controller for selectively positioning a reference indicator recognized by the computer;
signaling the computer to activate a control movement mode wherein the movement of the reference indicator in the control movement mode is for rotating the displayed object about an axis that is determined by the direction of the control movement of the reference indicator and the location of the control movement of the reference indicator relative to the bounded reference region;
moving the reference indicator in the control movement mode using the input controller by moving said input controller in two dimensions to provide a defined movement; and
rotating the displayed object about any arbitrary axis in three-dimensional space when said reference indicator is within said bounded reference region, said rotating being in accordance with the defined movement in the control movement mode, wherein the rotation of the displayed object is defined solely by the direction of the movement of the reference indicator and the location of the control movement of the reference indicator relative to said bounded reference region, said arbitrary axis being user defined.

* * * * *